Dec. 26, 1967  J. B. WEBB  3,359,647

ROTARY DRUM DRIER WITH IMPROVED CONDENSATE WITHDRAWAL MEANS

Filed Jan. 5, 1966  3 Sheets-Sheet 2

Dec. 26, 1967 J. B. WEBB 3,359,647
ROTARY DRUM DRIER WITH IMPROVED CONDENSATE WITHDRAWAL MEANS
Filed Jan. 5, 1966 3 Sheets-Sheet 3

United States Patent Office 3,359,647
Patented Dec. 26, 1967

3,359,647
ROTARY DRUM DRIER WITH IMPROVED
CONDENSATE WITHDRAWAL MEANS
Joseph B. Webb, Neenah, Wis., assignor to Kimberly-Clark Corporation, Neenah, Wis., a corporation of Delaware
Filed Jan. 5, 1966, Ser. No. 518,923
4 Claims. (Cl. 34—124)

ABSTRACT OF THE DISCLOSURE

A steam heated drier drum having a pair of condensate removal manifolds extending longitudinally within the drum and located opposite each other, a plurality of small diameter condensate collector tubes extending radially inwardly into the manifolds and outwardly into close proximity to the interior surface of the drum, and a pair of condensate withdrawal branch pipes extending from each manifold and arcuately within the drum to radially extending condensate withdrawal pipes connected to the central axle of the drum from which condensate may flow.

---

The invention relates to steam heated drier drums, which may be used in papermaking machines, for example, and more particularly to condensate drainage systems for such drier drums.

A quite effective condensate withdrawal system for a Yankee drier drum has been previously proposed in the co-pending application, Ser. No. 438,837, filed Mar. 11, 1965 (now Patent No. 3,299,530, issued January 24, 1967), of which I am one of the joint inventors. The condensate withdrawal system disclosed in this prior application includes a plurality of manifolds within the drier drum which extend longitudinally of the drum adjacent its inner surface and each of which has a plurality of spaced, small diameter, radially extending, condensate withdrawal tubes extending into it and terminating in close proximity to the inner drum surface. The steam condensing on the inner wall of the drier drum forms condensate, which must be continually removed in order to obtain good heat transfer and which is held against the shell be centrifugal force to cover the entire inner wall of the drum, and the condensate flows into these small diameter withdrawal tubes so as to maintain the condensate in a very thin sheet on the inner wall of the drum.

Each of these manifolds has a smaller number of larger diameter outlet tubes connecting it with the axle and journal of the drier drum through which condensate may flow, and these larger diameter tubes extend radially into the manifold to terminate outwardly beyond the inner ends of the small diameter tubes. A pond of water tends to collect, due to centrifugal force, in each manifold on its outermost surface; and the larger diameter tubes draw from the pond of water rather than directly from the small diameter tubes and thus tend to even out the condensate flow through the small diameter tubes.

The larger diameter outlet tubes in this prior construction each have four or five bends in them, and I have found that there is a tendency of the condensate liquid to accumulate and pond at these bends tending to close the tubes at these points. Apparently, liquid passing along with the vapor through the condensate withdrawal tubes tends to pond in the outer surfaces of these bends due to centrifugal force, particularly since the liquid and vapor are traveling at extremely high speeds, such as 100 to 150 feet per second; and the liquid tends to surge back and forth in these ponds and to block the outlet tubes at these points.

It is, therefore, an object of the present invention to provide an improved condensate withdrawal system of this general type having a minimum number of such conduit bends in which liquid may agglomerate.

The invention consists of the novel constructions, arrangements and devices to be hereinafter described and claimed for carrying out the above stated objects, and such other objects, as will be apparent from the following description of a preferred form of the invention, illustrated with reference to the accompanying drawings, wherein:

Like characters of reference designate like parts in the several views.

Figure 1:
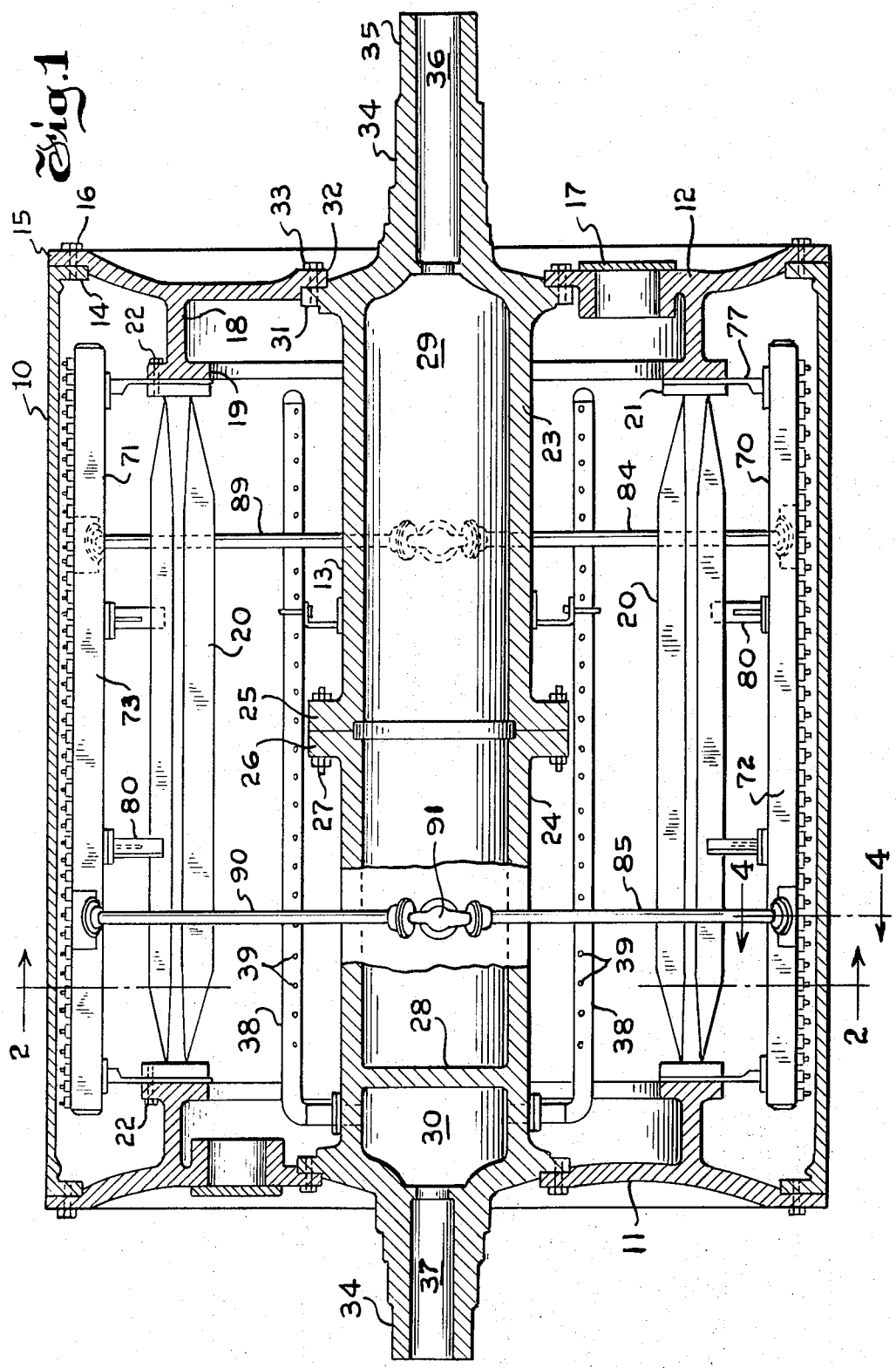
FIG. 1 is a longitudinal sectional view of a Yankee drier drum incorporating a condensate removal system according to the teachings of the invention.
Figure 2:
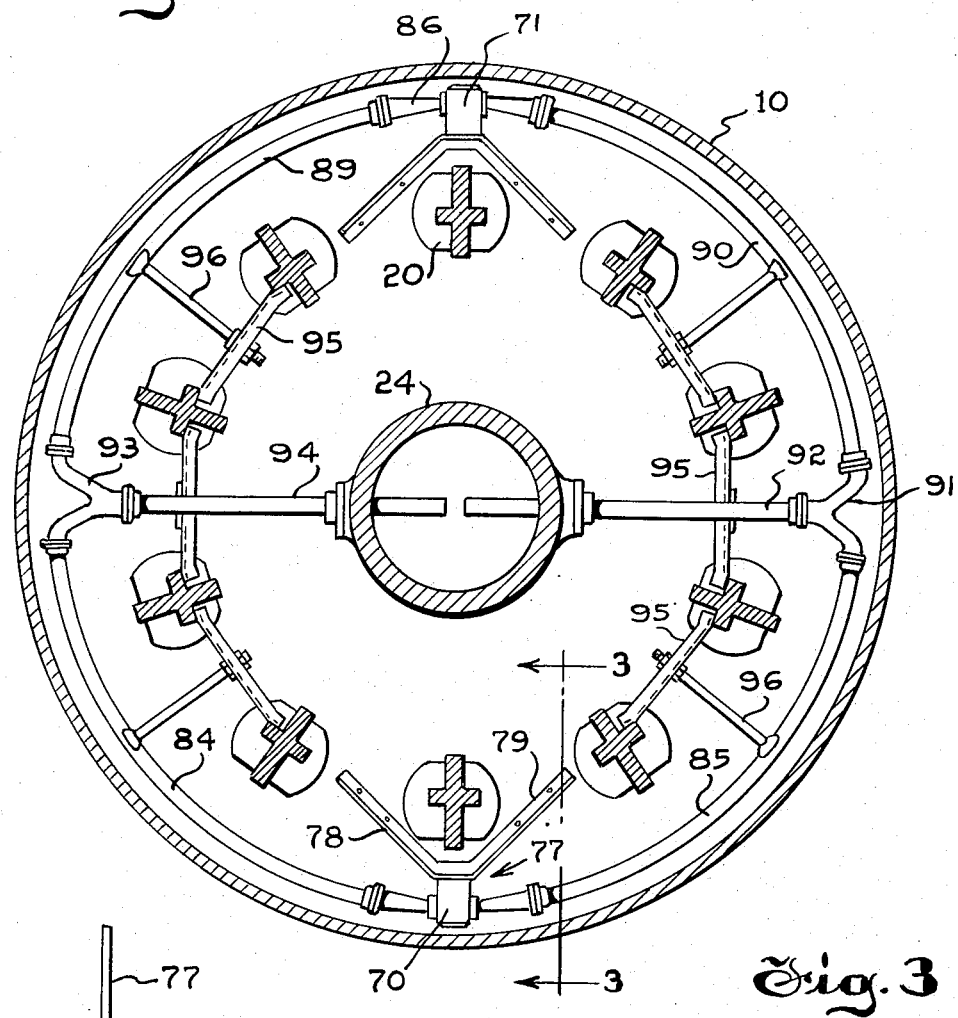
FIG. 2 is a sectional view taken on line 2—2 of FIG. 1.
Figure 3:
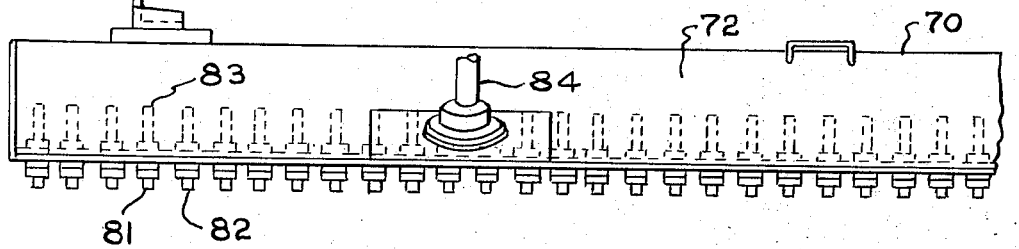
FIG. 3 is a sectional view on an enlarged scale taken on line 3—3 of FIG. 2.

Referring now to the drawings, the illustrated drier drum may be seen to compries a thin outer shell 10 which is rigidly secured at its ends to a pair of relatively flat, ring-shaped heads 11 and 12 supported by a hollow central axle or shaft 13. The shell 10 is provided at each end with an integral bolting flange 14 which is machined to mate with a similar peripheral flange 15 on the adjacent head. The rigid attachment of the shell to each head may be made as shown by means of a plurality of bolts 16 inserted from the inside of the shell and drawn up by nuts on the outside of the shell. Each of the heads 11 and 12 is provided with a manhole 17 to provide access to the interior of the drum for assembling and maintenance.

A short cylindrical section 18, provided at its inner end with a machined bolting flange 19, is formed integrally with each of the heads 11 and 12 and extends longitudinally inside the drum at a radial location intermediate the inner and outer edges of the head. A plurality of heavy staying members 20 extend between the heads longitudinally of the drier and are fixed with respect to the flanges 19 by means of flanges 21 formed on the staying members and bolts 22 that extend through the flanges 19 and 21. The purpose of the staying members 20 is to control the bowing of the heads 11 and 12 and to eliminate stress occurring in the shell 10 at or near its connection to the heads.

The shell 10 and heads 11 and 12 are of cast construction, and the central shaft 13 is also of cast construction and is formed in two halves 23 and 24. The halves 23 and 24 are provided with flanges 25 and 26, and bolts 27 extend through the flanges to fix the halves 23 and 24 together. A separator 28 is formed in the half 24 so as to provide two separate compartments 29 and 30 in the axle 13.

The shaft 13 near each end is provided with an enlarged bolting flange 31, and each head 11 and 12 is provided with a flange 32 that meets with the flange 31; and the flanges 31 and 32 are fixed together by means of bolts 33. The shaft 13 is extended at each end to provide journals 34 for rotatably supporting the drier in suitable bearings, a shaft extension 35 being provided at one end of the shaft 13 for mounting a driving gear or sprocket or the like. The shaft 13 at its ends is provided with bores 36 and 37 which are respectively in communication with the chambers 29 and 30; and the bores 37 and 36 may be utilized respectively for providing steam under pressure into the compartment 30 and for withdrawing the steam condensate from the compartment 29.

Steam under pressure is supplied to the interior of the drier drum by means of steam supply pipes 38 which have rows of steam discharge openings 39 formed in them and which extend axially of the drier drum along the shaft 13. The pipes 38 are connected to the compartment 30.

Figure 4:
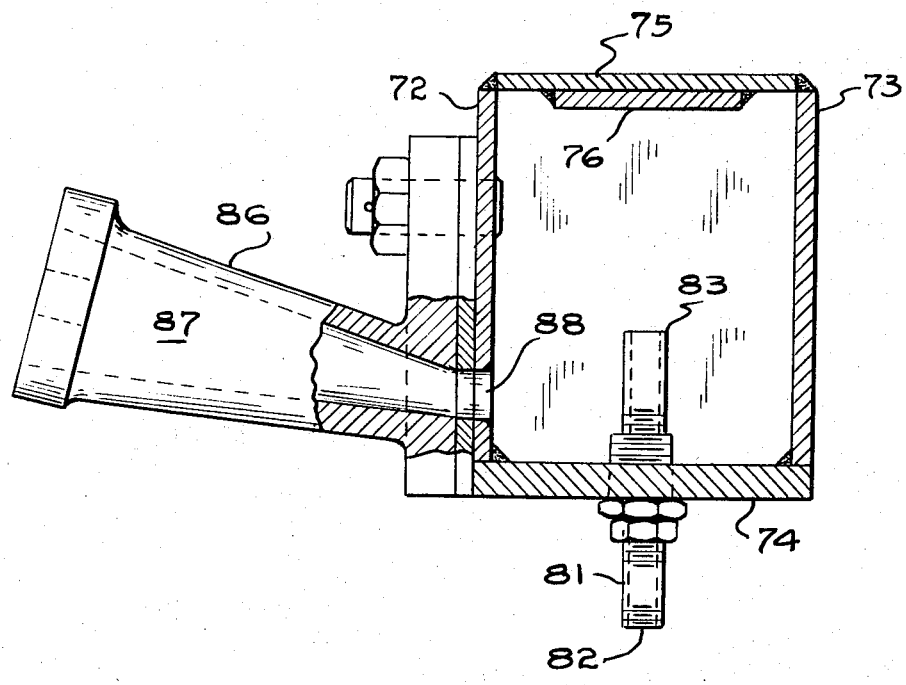
FIG. 4 is a sectional view on an enlarged scale taken on line 4—4 of FIG. 1.

The condensate withdrawal system of the invention comprises a pair of manifolds 70 and 71 positioned oppositely from each other with respect to the axle 13 and located adjacent the inner surface of the shell 10. Each of the manifolds 70 and 71 is rectangular in cross section, as shown in FIG. 4, and comprises rectangular side pieces 72 and 73 and rectangular end pieces 74 and 75 which are welded together at their edges. A shield bar 76 is preferably fixed to the inner surface of the end piece 75 of each manifold. Each manifold is supported at its ends from the bolting flanges 19 by means of triangular supports 77, each comprising a pair of legs 78 and 79 bolted to a flange 19. The manifolds are supported from the staying members 20 intermediate their ends by means of ties 80.

A plurality of equal length small diameter tubes 81 extend radially through the end piece 74 of each of the manifolds 70 and 71. The tubes have their outer ends 82 terminating closely adjacent the inner surface of the shell 10 and have their inner ends 83 terminating well within the associated manifold, close to the longitudinal center of the manifold. The small diameter tubes 81 are closely spaced to each other on the end 74 of each of the manifolds and may, for example, be located on 2¼ inch centers.

The manifold 70 has a pair of condensate withdrawal branch pipes 84 and 85 connected with it. The connection of each of the pipes 84 and 85 to the manifold 70 is by means of a fitting 86 having an outwardly flaring opening 87 within it. The fitting 86 for the branch pipe 84 is fixed to the side piece 73, and the fitting 86 for the branch pipe 85 is fixed to the side piece 72; and the side pieces 72 and 73 have rectangular openings 88 in them which correspond in size and shape to and are in communication with the adjacent end of the opening 87.

The manifold 71 has condensate withdrawal branch pipes 89 and 90 connected to it by means of fittings 86. The pipes 89 and 90 are connected respectively to the side pieces 72 and 73 of the manifold 71. It will be observed that all of the pipes 84, 85, 89 and 90 are in the shape of arcs, each sub-tending an angle at the center of the shell 10 of nearly 90°, and these pipes are substantially equally spaced from the interior surface of the shell 10.

The pipes 85 and 90 are connected together by means of a Y-shaped fitting 91, and the central leg of the fitting 91 is connected by means of a radially extending, larger diameter pipe 92 with the axle 13 and particularly with the compartment 29 in the axle. Another Y-shaped fitting 93 is provided for connecting the pipes 84 and 89 together, and the central leg of the fitting 93 is connected with the compartment 29 by means of a pipe 94 which is similar to the pipe 92.

The branch pipes 84, 85, 89 and 90 are supported intermediate their ends by means of support brackets 95 extending between adjacent staying members 20 and tie rods 96 extending between the brackets 95 and the pipes 84, 85, 89 and 90.

It will be noted from FIG. 1 that the pipes 85 and 90 are disposed as an assembly between the center and one end of the shell 10, and the pipes 84 and 89 are disposed as an assembly between the center of the shell 10 and the other ends of the shell. Assuming that the drier shell 10 has a length of 15 feet, for example, the two assemblies of withdrawal branch pipes may, for example, be about six feet apart.

In operation, a moist paper web is directed onto the outer surface of the shell 10, and the drum may be rotated, by means of the sprocket or other driving mechanism on the extension 35, at a high speed, such as at a peripheral speed of 4,000 to 5,000 feet per minute, for example. The web is dried as the drum rotates, and the web may be creped off the outer surface of the drum by means of a suitable creping blade (not shown).

Steam under pressure is supplied to the compartment 30 through the bore 37, and the steam is directed into the internal compartment of the drum through the supply pipes 38 and the discharge openings 39 in the pipes 38. The steam heats the drier drum, and, in doing so, it condenses into water; and the water condensate remains on the internal surface of the shell 10, completely around the shell, due to the action of centrifugal force, to a depth of ¼ inch, for example. The condensate removal system, including the manifolds 70 and 71, the small diameter tubes 81 and the condensate withdrawal pipes 84, 85, 89, 90, 92 and 94, remove this condensate.

Steam within the drier drum rushes to the ends 82 of the tubes 81 located close to the internal drum surface, since the pressure within the tubes 81 and in the connected manifolds 70 and 71 and compartment 29 is lower than the pressure of the steam within the drum. The steam in entering the ends 82 of the small diameter tubes 81 sweeps across the inner surface of the drier drum and atomizes the condensate existing on the inner drum surface. Thus, a steam-water mixture passes radially inwardly through the bores of the tubes 81 into the manifolds 70 and 71. In order that such atomization occurs, the velocity of the steam entering the bores of the small diameter tubes 81 is high; and the velocity of the steam-water mixture within the tubes 81 may, for example, be between 100 and 150 feet per second.

Steam-water mixture flows radially inwardly through the tubes 81, and some of the steam condenses as it passes through the tubes 81; however, the pressure of the steam within the drier drum is sufficient to move the water-steam mixture inwardly against the action of centrifugal force, particularly since there is atomization in the vicinity of the ends 82 of the tubes 81. Some condensation takes place within the manifolds 70 and 71, and the water condensate tends to collect on the outer end pieces 74 of the manifolds due to centrifugal force. It will be noted that the openings 88 are located quite close to the pieces 74 and farther radially outwardly than the ends 83 of the tubes 81, and thus substantially the same atomizing action takes place in the vicinity of the openings 88 as takes place at the ends 82 of the tubes 81. The steam in sweeping across the sides of the openings 88 atomizes the water tending to pond on the pieces 74 and draws it along with the steam as a water-steam mixture into the fittings 86 and into the semi-circular condensate withdrawal branch pipes 84, 85, 89 and 90. The condensate flows from the branch pipes 84, 85, 89 and 90 into the Y-shaped fittings 91 and 93 and through the relatively large diameter condensate withdrawal pipes 92 and 94 into the compartment 29. The condensate may be withdrawn from the compartment 29 by conventional means.

It will be observed that there are no very sharp bends in the condensate withdrawal pipes connected to the manifolds 70 and 71, the only bends that can be considered relatively sharp existing only in the Y-shaped fittings 91 and 93 which change the direction of flow of condensate through substantially 90°. The condensate withdrawal piping, thus, has a minimum effect in blocking flow of condensate which could cause an undesirable collection of condensate in either the manifolds 70 and 71 or on the inner surface of the shell 10. The piping also has the additional advantage of tending to equalize the flow from the two manifolds 70 and 71, since each of these manifolds has two condensate outlets, one each in opposite circumferential directions. The manifold 70, for example, has the pipe 84 extending in one circumferential direction and has the other pipe 85 extending in the other circumferential direction.

It will be understood that the invention is not to be limited to the specific constructions, arrangements and devices shown and described, except only insofar as the claims may be so limited, as it will be understood to those skilled in the art that changes may be made without departing from the principles of the invention.

What is claimed is:

1. A hollow drier drum having journals for rotatably mounting the drum, a steam supply connection for directing steam into the drum, a manifold in said drum and lying adjacent to the inner surface of the drum, a plurality of water condensate removal tubes extending into and carried by said manifold and terminating closely adjacent to the inner drum surface, a condensate removal connection, and piping for connecting said condensate removal connection and said manifold and including an arcuate pipe extending adjacent the inner drum surface and circumferentially of the drum and terminating in said manifold at a place closer to the inner drum surface than the inner ends of said tubes so as to prevent blockage by condensate of said tubes.

2. A drier drum as set forth in claim 1 with the drum comprising a hollow axle, which has said journals formed on opposite ends of the axle, and which has a condensate duct extending through one of the journals, and the inner chamber of which along with said duct constitutes said condensate removal connection having said piping connected to it.

3. A drier drum as set forth in claim 1, said piping including a plurality of said arcuate pipes extending circumferentially of the drum to opposite sides of said manifold and connected with said condensate removal connection.

4. A drier drum as set forth in claim 2, another similar manifold in said drum and located oppositely with respect to said first named manifold, said piping including a plurality of additional arcuate pipes similar to said first named pipe so arranged that each of said manifolds has a pair of said arcuate pipes extending to opposite sides of the manifold and said piping including a plurality of radially extending pipes connecting the ends of said arcuate pipes with the inner chamber of said hollow axle.

References Cited

UNITED STATES PATENTS

| | | | |
|---|---|---|---|
| 2,420,824 | 5/1947 | Hornbostel | 165—89 X |
| 2,817,908 | 12/1957 | Hornbostel | 34—119 X |
| 3,224,110 | 12/1965 | Kroon | 34—124 |

FREDERICK L. MATTESON, JR., *Primary Examiner.*

A. D. HERRMANN, *Assistant Examiner.*